United States Patent
Wu et al.

(10) Patent No.: US 7,310,099 B2
(45) Date of Patent: Dec. 18, 2007

(54) INFORMATION HANDLING SYSTEM INCLUDING DETECTION OF INAPPROPRIATE VIDEO CONNECTION

(75) Inventors: Shuguang Wu, Round Rock, TX (US); Faisal Awan, Round Rock, TX (US); Orlando Rigueira, Georgetown, TX (US); Aaron Taylor, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 124 days.

(21) Appl. No.: 10/838,011

(22) Filed: May 3, 2004

(65) Prior Publication Data

US 2005/0243095 A1   Nov. 3, 2005

(51) Int. Cl.
*G06F 13/14* (2006.01)
*G06F 15/16* (2006.01)
*G09G 5/37* (2006.01)

(52) U.S. Cl. ............. 345/520; 345/503; 345/561
(58) Field of Classification Search .......... 714/37; 710/302, 2, 11; 713/300; 345/502, 3.1, 345/520, 204
See application file for complete search history.

(56) References Cited

U.S. PATENT DOCUMENTS

| | | | | |
|---|---|---|---|---|
| 5,561,764 A | * | 10/1996 | Ninomiya | 714/37 |
| 6,035,355 A | * | 3/2000 | Kelley et al. | 710/302 |
| 6,038,670 A | * | 3/2000 | Oh | 713/300 |
| 6,141,021 A | * | 10/2000 | Bickford et al. | 345/503 |
| 6,329,983 B1 | | 12/2001 | Wang | |
| 6,864,891 B2 | * | 3/2005 | Myers | 345/502 |
| 2004/0178968 A1 | * | 9/2004 | Kizaki | 345/2.2 |
| 2004/0233188 A1 | * | 11/2004 | Anderson | 345/204 |

OTHER PUBLICATIONS http://www.digit-life.com/articles2/radeon-tv-out, "Composite and S-Video Connection of RADEON Cards to TV and Movie Playback".

* cited by examiner

*Primary Examiner*—Kee M. Tung
*Assistant Examiner*—Hau H Nguyen
(74) *Attorney, Agent, or Firm*—Haynes and Boone, LLP

(57) ABSTRACT

A method for detecting an inappropriate video connection in an information handling system ("IHS") that includes an integrated video controller, the integrated video controller operable to be coupled to a display device, is provided. The method includes determining if an add-in video controller is coupled to the IHS, the add-in video controller operable to be coupled to the display device. The method also includes determining whether the display device is coupled to the integrated video controller or the add-in video controller. The method further includes providing a notification that the display device is inappropriately coupled to the IHS if it was determined that both the add-in video controller is coupled to the IHS and the display device is coupled to the integrated video controller.

22 Claims, 4 Drawing Sheets

INFORMATION HANDLING SYSTEM INCLUDING DETECTION OF INAPPROPRIATE VIDEO CONNECTION

BACKGROUND

The description herein relates generally to information handling systems ("IHS's") and more particularly to video controllers for IHS's.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many modern IHS's include an integrated video controller, namely a video or graphics controller which is located on the system board of the IHS. In addition to the integrated video controller, many IHS's also include an "add-in" video controller (e.g., Peripheral Component Interconnect ("PCI") video controller, an Advanced Graphics Port ("AGP") video controller or a PCI Express video controller). An IHS equipped with both an integrated video controller and an add-in video controller may disable the integrated video controller and enable only the add-in video controller. Thus, if a user of the IHS connects a display device (e.g., a Cathode Ray Tube ("CRT") monitor or Liquid Crystal Display ("LCD") monitor) to the IHS by connecting to the integrated video controller, the user may perceive that the IHS or the display device is malfunctioning because the display device does not display a video signal from the IHS. Such a perception causes various problems including, for a manufacturer or seller of IHS's with both an integrated video controller and an add-in controller, increased customer support costs and loss of good will.

With a current technique, a manufacturer or seller of an IHS with both an integrated video controller, and an add-in video controller, physically conceals a connection interface of the integrated video controller by, for example, placing a plastic cap over the interface. This cap is used to discourage the user from plugging a display device into the integrated video controller. However, this approach is ineffective when the user nevertheless decides to remove the cap and plug the display device into the integrated video controller.

Accordingly, what is needed is an IHS and technique without the disadvantages described above.

SUMMARY

A method for detecting an inappropriate video connection in an information handling system ("IHS") that includes an integrated video controller, the integrated video controller operable to be coupled to a display device, is provided. The method includes determining if an add-in video controller is coupled to the IHS, the add-in video controller operable to be coupled to the display device. The method also includes determining whether the display device is coupled to the integrated video controller or the add-in video controller. The method further includes providing a notification that the display device is inappropriately coupled to the IHS if it was determined that both the add-in video controller is coupled to the IHS and the display device is coupled to the integrated video controller.

DETAILED DESCRIPTION

For purposes of this disclosure, an IHS includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. Examples of an IHS include, personal computer ("PC"), a network storage device, personal digital assistant, or any other suitable device with variations in size, shape, performance, functionality, and price. An IHS also includes other components such as, random access memory ("RAM"), one or more processing resources (e.g., central processing unit ("CPU"), hardware or software control logic, read only memory ("ROM"), other types of memory, one or more disk drives, one or more network interfaces, one or more input/output devices and/or one or more buses.

Figure 1:
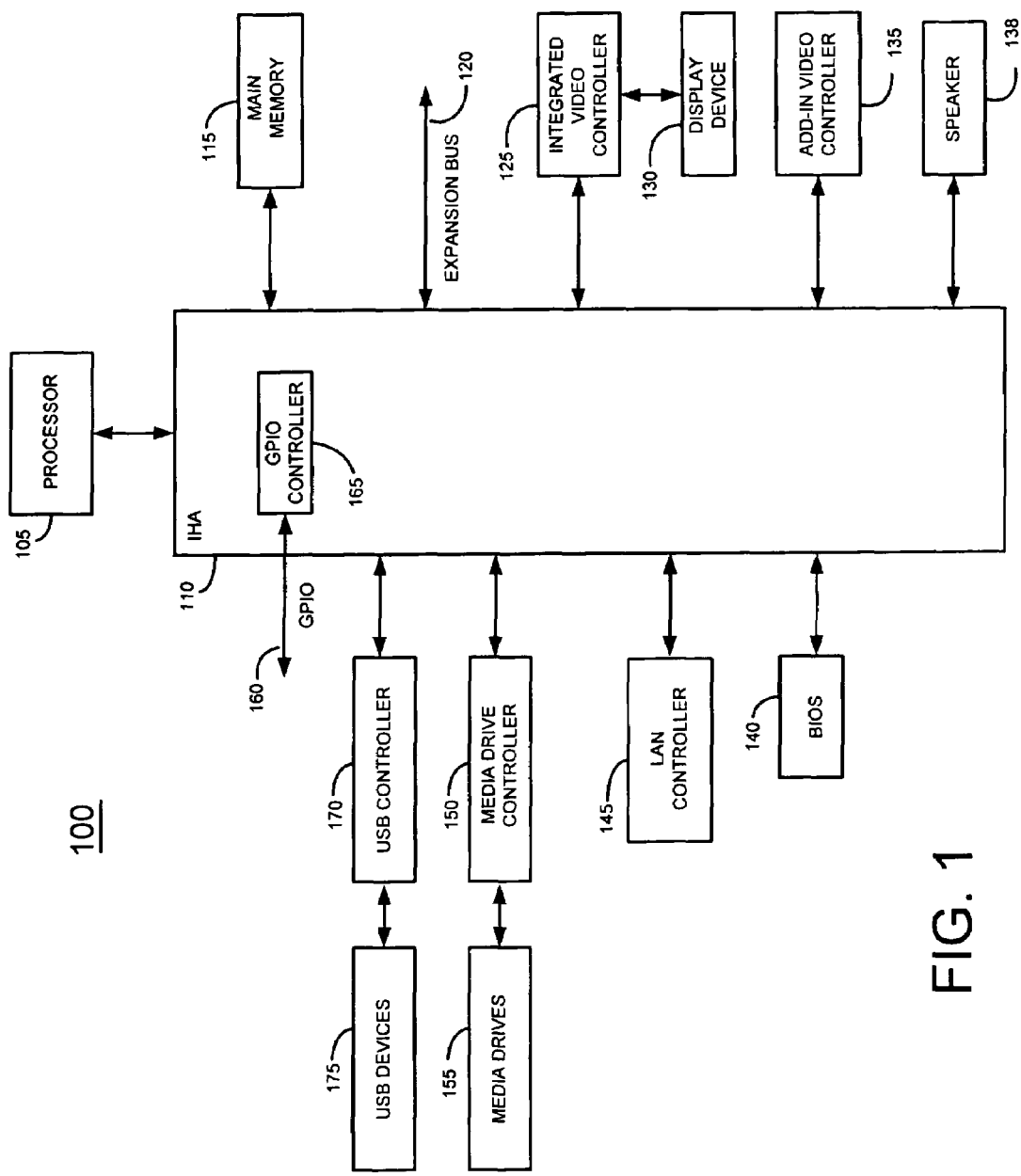
FIG. 1 is a block diagram of an information handling system ("IHS") according to an illustrative embodiment.

FIG. 1 is a block diagram of an IHS indicated generally at 100, according to the illustrative embodiment. The IHS 100 includes a processor 105 (e.g., an Intel Pentium series processor). An Intel Hub Architecture (IHA) chipset 110 provides the IHS 100 with graphics/memory controller hub functions and I/O functions. More specifically, the IHA chipset 110 acts as a host controller which communicates with an integrated video controller 125 coupled thereto. A display device 130 is coupled to the integrated video controller 125 (e.g., on-board video controller). Although the display device 130 is coupled to the integrated video controller as shown in FIG. 1, display device 130 is also capable of being coupled instead to an add-in video controller 135. The add-in video controller 135 is an advanced graphics port ("AGP") video controller, or alternatively, any other suitable video controller such as Peripheral Component Interconnect ("PCI") video controller or PCI Express video controller. The add-in video controller includes a video connection interface such as a digital video connection interface (e.g., a Digital Visual Interface ("DVI")) or an analog video interface in this particular embodiment.

The chipset 110 further acts as a controller for main memory 115 which is coupled thereto. The chipset 110 also acts as an input/output ("I/O") controller hub (ICH) which performs I/O functions. A general purpose input/output ("GPIO") 160 is coupled to the chipset 110 via a GPIO controller 165. A USB controller 170 is coupled to chipset 110 so that devices such as USB devices 175 can be connected to the chipset 110 and the processor 105. The USB devices 175 include, for example, floppy disk drives, CD-ROM drives, DVD-ROM drives and other devices which support the USB standard. A system basic input-output system ("BIOS") 140 is coupled to chipset 110 as shown. The BIOS 140 is stored in CMOS or FLASH memory so that it is nonvolatile.

A local area network (LAN) controller 145, alternatively called a network interface controller (NIC), is coupled to the chipset 110 to facilitate connection of the IHS 100 to other information handling systems. A media driver controller 150 is coupled to chipset 110 so that devices such as media drives 155 can be connected to the chipset 110 and the processor 105. Examples of the media devices 155 capable of being coupled to the media controller 150 include CD-ROM drives, DVD drives, hard disk drives and other fixed or removable media drives. An expansion bus 120, such as a PCI bus, PCI Express bus, serial advanced technology attachment (SATA) bus or other bus is coupled to the chipset 110 as shown. The expansion bus 120 includes one or more expansion slots 122 for receiving expansion cards which provide the IHS 100 with additional functionality. The IHS 100 also includes a speaker (e.g., loudspeaker) 138 for outputting audio signals. The speaker 138 is coupled to the chipset 110.

Figure 2A:
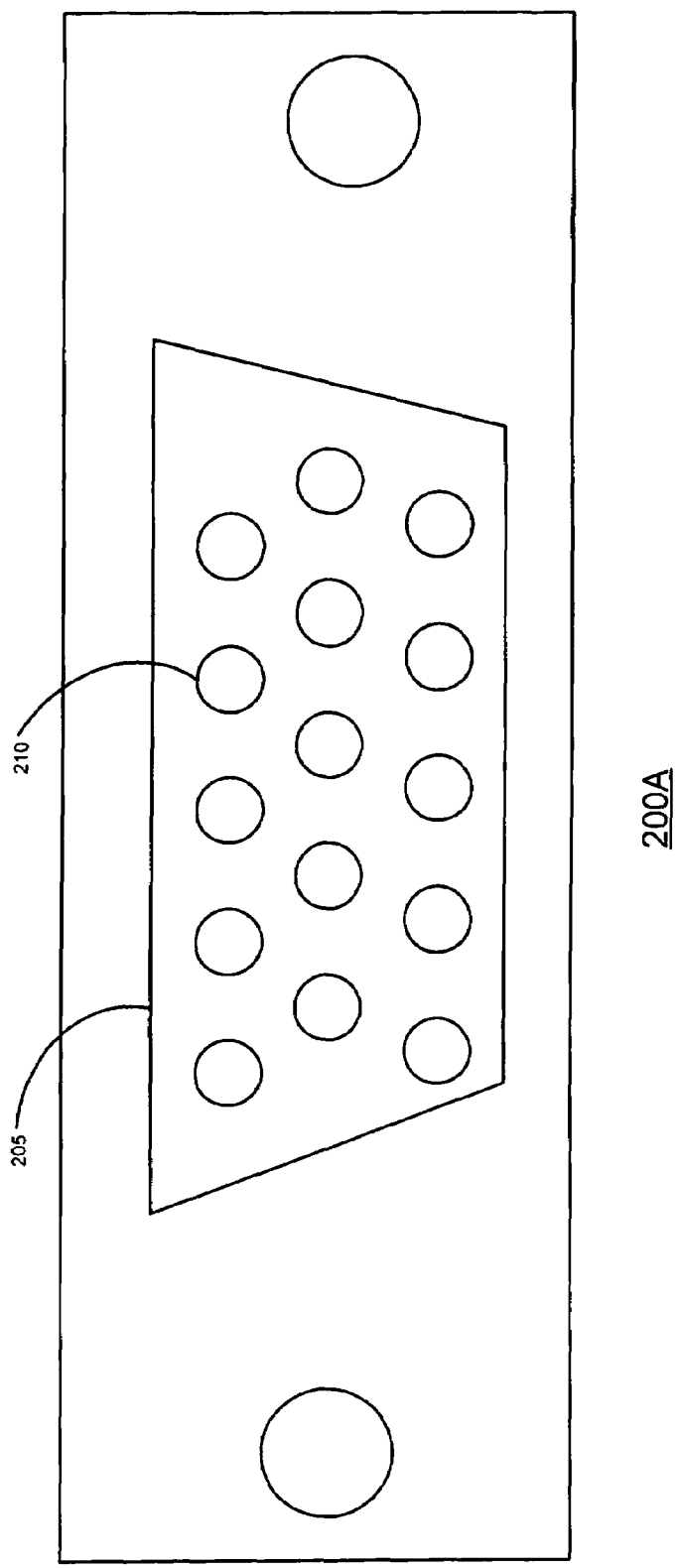
FIG. 2a is a block diagram of a video connection interface of an integrated video controller of FIG. 1.

FIG. 2a is a block diagram of a video connection interface (e.g., "connector", video port) 200A of the integrated video controller 125. The connection interface 200A is a conventional "DB-15" connection interface (e.g., a Video Graphics Array ("VGA") interface). Accordingly, the connection interface 200 includes a set of 15 "pins" designated generally at 205. Of the pins 205, at least one pin 210 (e.g., pin number 4) is an optional or an undefined pin (e.g., a pin which does not carry a defined video signal, Display Data Channel (DDC) signal, power or ground signal).

Figure 2B:
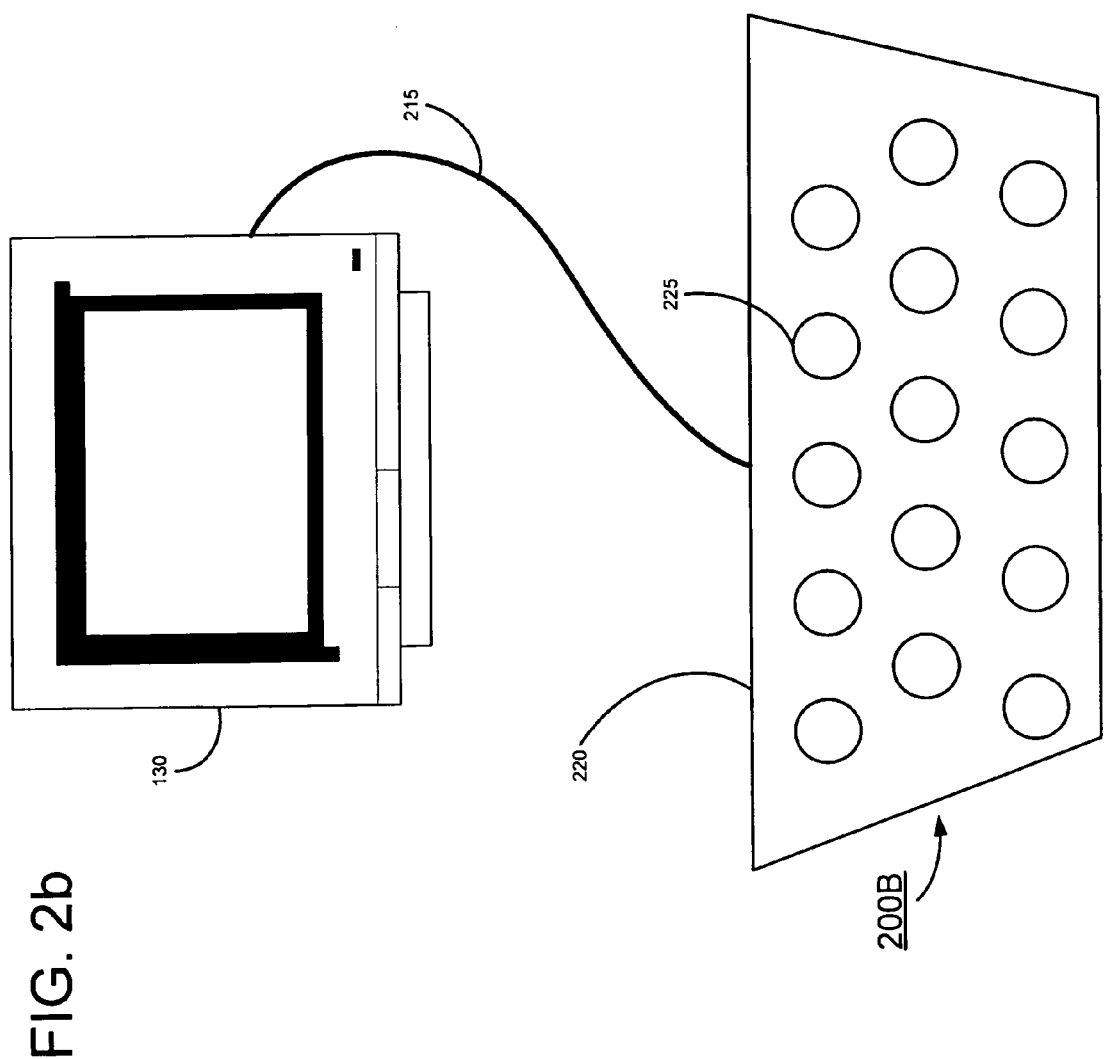
FIG. 2b is a block diagram of a video connection interface of a display device of FIG. 1.

FIG. 2b is a block diagram of a video connection interface (e.g., "connector", video port) 200B of the display device 130. As shown, the connection interface 200B is coupled to the display device 130 via a cable (e.g., video cable) 215. Similar to the connection interface 200A, the connection interface 200B includes a corresponding set of pins designated generally at 220. Likewise, the connection interface 200B also includes at least one corresponding undefined pin 225.

Referring simultaneously now to FIGS. 2a and 2b, via the pins 205 of connection interface 200A and a corresponding set of pins 220 of connection interface 200B, the display device 130 is capable of being coupled (e.g., connected) to the integrated video controller 125 so that controller 125 can transmit video signals to display device 130. More specifically, physical attributes of connection interfaces 200A and 200B allow each of the pins 205 to be in electrical contact with respective corresponding pins 220. For example, in one embodiment, the connection interface 200A is a "female" connection interface and the connection interface 200B is a "male" connection" interface. In an alternative embodiment, connection interface types are reversed so that the connection interface 200A is a "male" connection interface, and the connection interface 200B is a "female" connection interface.

Figure 3:
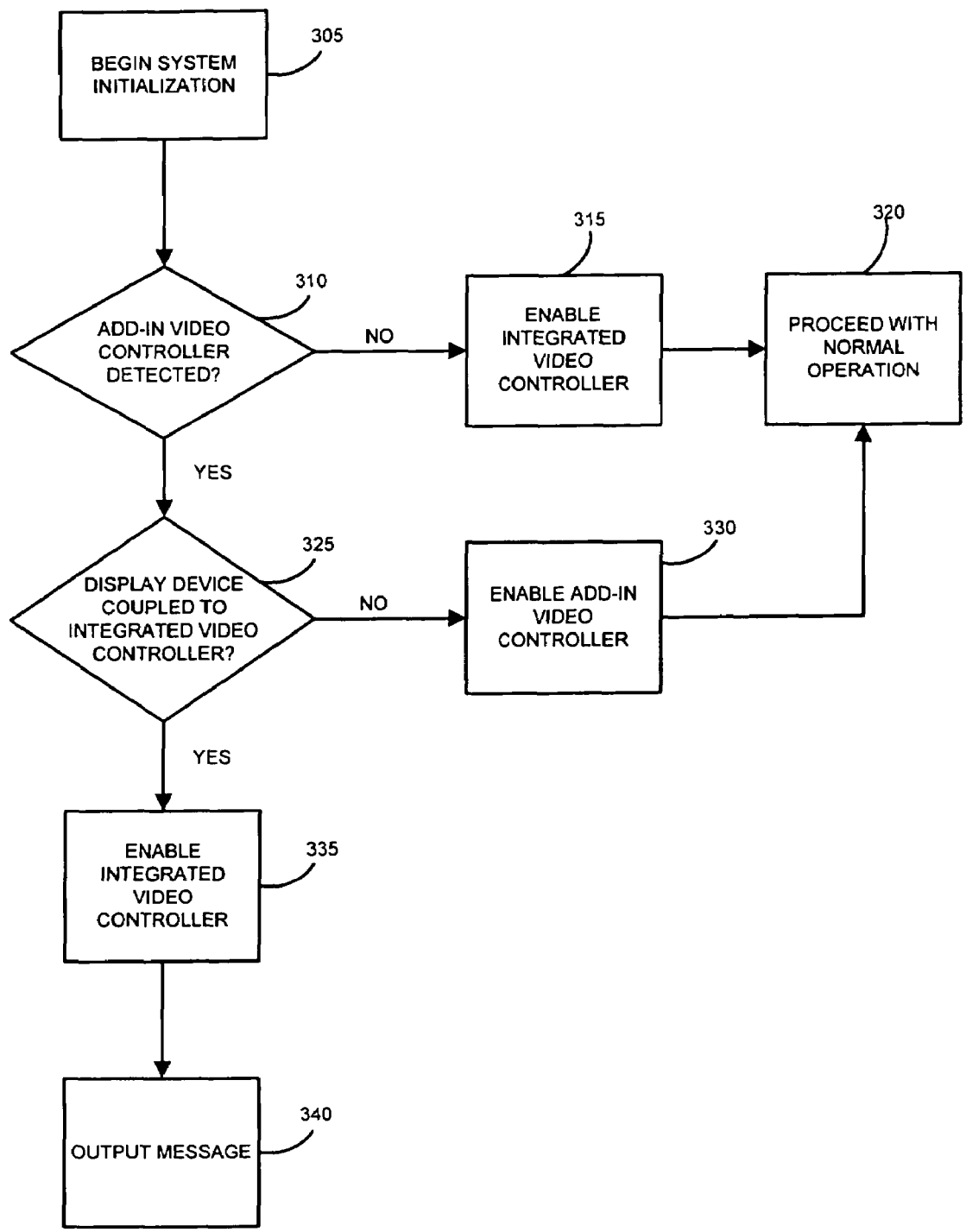
FIG. 3 is a flow chart illustrating operations performed by the IHS of FIG. 1.

FIG. 3 is a flow chart illustrating operations performed by the IHS 100 to determine whether a display device is inappropriately coupled to the integrated video controller 125. Operations shown in the flow chart of FIG. 3 are generally controlled by instructions stored in system BIOS 140 which is non-volatile storage in this particular embodiment. The operation begins at a step 305, where the IHS 100 begins to initialize itself, for example, by a "boot" process. The IHS 100 begins to initialize itself in response to a user turning the IHS 100 on. After the step 305, the operation continues to a step 310.

At a step 310, the IHS 100 determines whether it detects an add-in video controller (e.g., the add-in video controller 135). If the IHS 100 determines that an add-in video controller is not detected, the operation continues to a step 315. Also, this is an indication that an add-in video controller is likely not installed in the IHS 100 or that if an add-in video controller is installed, the video controller is likely not functioning properly in the IHS 100. Accordingly, at the step 315, the IHS 100 enables the integrated video controller 125 for performing the IHS 100's video operations (e.g., outputting a video signal to the display device 130). More specifically, the BIOS 140 of the IHS 100 enables the integrated video controller. After the step 315, the IHS 100 proceeds with its normal operation (e.g., continue the initialization process) as shown in a step 320.

Referring again to the step 310, if the IHS 100 determines that an add-in video controller is detected, the operation continues to a step 325. For clarity, the following discussion references the add-in video controller 135 as being the add-in video controller that is detected at the step 310. At the step 325, the IHS 100 determines whether the display device 130 is coupled to the integrated video controller 125. In the illustrative embodiment, the IHS 100 makes the determination by detecting a logic state (e.g., low, high) of an undefined pin (e.g., the undefined pin 210) of the connection interface 200A of the integrated video controller 125. More particularly, the logic state of the undefined pin 210 is initially set to high through a "pull-up" resistor, and a logic state of the undefined pin 225 is set to low (e.g., coupled to ground). If the display device 130 is not coupled to the integrated video controller 125, then the logic state of the undefined pin 210 remains at its initial state of high. Accordingly, in response to its detecting the logic state of the undefined pin 210 to be high, the IHS 100 determines that the display device 130 is not coupled to the integrated video controller 125. However, in response to the display device 130 being coupled to the integrated video controller 125, the logic state of the undefined pin 210 changes from its initial state of high to low. If the IHS 100 detects that the logic state of the undefined pin 210 is low, then the IHS 100 determines that the display device 130 is coupled to the integrated video controller 125.

Although in the illustrative embodiment, the logic state of the undefined pin 210 is initially set to high and the logic state of the undefined pin 225 is set to low, in an alternative embodiment, the logic states are reversed. For example, in the alternative embodiment, the logic state of the undefined pin 210 is initially set to low through a "pull-down" resistor, and the logic state of the undefined pin 225 is set to high. Accordingly, if the display device 130 is coupled to the integrated video controller 125, the logic state of the undefined pin 210 changes to high, and such logic state is detected by the IHS 100 during the step 325. Conversely, if the display device 130 is not coupled to the integrated video controller 125, the logic state of the undefined pin 210 remains low, and such logic state is also detected by the IHS 100 during the step 325.

Also, in the illustrative embodiment, the detection of the lociic state of the undefined pin 210 is performed by the GPIO controller 160. During initiation of the IHS 100 (e.g., "boot") process, the BIOS 140 inquires the GPIO controller 160 for the logic state of the undefined pin 210. Accordingly, in response to detecting the logic state of the undefined pin 210, the GPIO controller 160 provides the detected logic state to the BIOS 140.

Referring again to the step 325, if the IHS determines that the display device 130 is not coupled to the integrated video controller 125, the operation continues to a step 330. This also indicates that the display device 130 is likely coupled appropriately to the add-in video controller 135. Accordingly, at the step 330, the IHS 100 enables the add-in video controller 135 for performing the video operations of the IHS 100. More specifically, the BIOS 140 enables the add-in video controller 135. After the step 330, the operation continues to the step 320, where the IHS 100 proceeds with its normal operation.

At the step 325, if the IHS 100 determines that the display device 130 is coupled to the integrated video controller 125, the operation continues to a step 335. Such determination by the IHS 100 also indicates that the display device 130 is inappropriately coupled to the integrated video controller 125, and the IHS 100 performs operations to aid a user of the IHS 100 recover from this situation. Accordingly, at the step 335, the IHS 100 enables the integrated video controller 125. More specifically, and similar to the steps 315 and 330, the BIOS 140 of the IHS 100 enables the integrated video controller 125. As shown, after the step 335, the operation continues to a step 340.

At the step 340, the IHS 100 outputs a message to the display device 130 through the integrated video controller 125. The message includes suitable text for indicating to the user of the IHS 100 that the display device 130 is coupled to an inappropriate video controller. In one example, the message includes the following text: "Attention! Your monitor is connected to the WRONG video port. Shut down the system and reconnect the monitor."

As can be seen from the above description, the disclosed technique provides a convenient way for a user of an IHS to receive an indication that a display device is coupled to an inappropriate video controller of the IHS. The disclosed technique will likely reduce the number of user calls to customer support services of a manufacturer and/or a seller of IHS's with both an integrated video controller and an add-in video controller.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be constructed broadly and in manner consistent with the scope of the embodiments disclosed herein.

The invention claimed is:

1. A method for detecting an inappropriate video connection in an information handling system ("IHS") comprising:
providing an IHS including an integrated video controller operable to be coupled to a display device;
coupling a connector to the display device in the IHS which sets the connector to a pre-determined logic state;
determining if an add-in video controller is coupled to the IHS, the add-in video controller operable to be coupled to the display device;
detecting a logic state of the connector to determine whether the display device is coupled to the integrated video controller; and
upon a determination that the add-in video controller is coupled to the IHS and that the display device is coupled to the integrated video controller, a basic input/output system (BIOS) of the IHS enabling the integrated video controller and the IHS outputting an appropriate message to the display device through the integrated video controller.

2. The method of claim 1 including displaying the appropriate message on the display device.

3. The method of claim 1 including annunciating the appropriate message in an audio message.

4. The method of claim 1 including enabling an add-in video controller if it is determined that an add-in video controller is coupled to the IHS and the display device is not coupled to the integrated video controller.

5. A method for detecting an inappropriate video connection in an information handling system ("IHS"), comprising:
providing an integrated video controller and an add-in video controller, each being operable to be coupled to a display device;
coupling a connector to the display device in the IHS which sets the connector to a pre-determined logic state;
detecting a logic state of the connector to determine whether the display device is coupled to the integrated video controller;
upon a determination that the display device is coupled to the integrated video controller, a basic input/output system (BIOS) of the IHS enabling the integrated video controller and disabling the add-in video controller; and
upon a determination that the display device is coupled to the add-in video controller, the BIOS of the IHS enabling the add-in video controller and disabling the integrated video controller.

6. The method of claim 5, and comprising:
in response to determining that the display device is coupled to the integrated video controller, outputting to the display device, a message indicating that the display device is inappropriately connected.

7. The method of claim 5, wherein the integrated video controller includes a video connection interface.

8. The method of claim 7, wherein detecting a logic state of the connector is via an otherwise undefined pin of the interface.

9. The method of claim 8, wherein detecting a logic state of the connector is by detecting one of first and second logic states of the undefined pin.

10. The method of claim 9, wherein the logic state of the otherwise undefined pin is the first logic state when no display device is coupled to the integrated video controller, and the second logic state when a display device is coupled to the integrated video controller.

11. The method of claim 10, wherein detecting a logic state of the connector is by detecting the logic state of the otherwise undefined pin to be the second logic state.

12. The method of claim 9, wherein the logic state of the otherwise undefined pin is the second logic state when no display device is coupled to the integrated video controller, and the first logic state when a display device is coupled to the integrated video controller.

13. The method of claim 12, wherein detecting a logic state of the connector is by detecting the logic state of the otherwise undefined pin to be the first logic state.

14. The method of claim 9, wherein a general purpose input/output ("GPIO") controller of the IHS detects the logic state of the otherwise undefined pin.

15. A information handling system ("IHS") comprising:
a processor;
an integrated video controller operable to be coupled to a display device;
an add-in video controller operable to be coupled to a display device;
a connector coupled to the display device in the IHS which sets the connector to a pre-determined logic state;
wherein the processor is configured to determine if a display device is coupled to the integrated video controller; and
upon a determination that the display device is coupled to the integrated video controller, a basic input/output system (BIOS) of the IHS enabling the integrated video controller and the IHS outputting an appropriate message to the display device through the integrated video controller.

16. The IHS of claim 15, wherein the display device displays the appropriate message.

17. The IHS of claim 15 including a loudspeaker that annunciates the appropriate message in an audio message.

18. The IHS of claim 15, wherein the add-in video controller is enabled if it is determined that the display device is not coupled to the integrated video controller.

19. A information handling system ("IHS") comprising:
a processor;
an integrated video controller coupled to the processor, the integrated video controller operable to be coupled to a display device;
an expansion slot for receiving an add-in video controller and coupling the add-in video controller to the processor, the add-in video controller operable to be coupled to a display device;
a connector coupled to the display device in the IHS which sets the connector to a pre-determined logic state;
wherein the processor is configured to determine if the add-in video controller is present in the expansion slot and to detect whether a display device is coupled to the integrated video controller; and
upon a determination that the add-in video controller is present in the expansion slot and detection that the display device is coupled to the integrated video controller, a basic input/output system (BIOS) of the IHS enabling the integrated video controller and the IHS outputting an appropriate message to the display device through the integrated video controller.

20. The IHS of claim 19, wherein the display device displays the appropriate message.

21. The IHS of claim 19 including a loudspeaker that annunciates the appropriate message in an audio message.

22. The IHS of claim 19, wherein the add-in video controller is enabled if it is determined that an add-in video controller is coupled to the IHS and the display device is not coupled to the integrated video controller.

* * * * *